United States Patent Office 3,663,624
Patented May 16, 1972

3,663,624
PREPARATION OF ANHYDROUS ALKALI MERCAPTIDES
Howard E. Jones, Wilmington, Del., assignor to E. I. du Pont de Nemours and Company, Wilmington, Del.
No Drawing. Filed Oct. 27, 1969, Ser. No. 869,900
Int. Cl. C07c *149/06*
U.S. Cl. 260—609 R     13 Claims

ABSTRACT OF THE DISCLOSURE

Anhydrous alkali mercaptides such as potassium methylmercaptide are prepared by reacting the corresponding mercaptan such as methylmercaptan with an aqueous solution of the alkali hydroxide such as potassium hydroxide, in an inert organic medium such as toluene followed by azeotropically distilling off the water while adding additional mercaptan to the reaction mass. The alkali mercaptide can be removed from the resulting anhydrous slurry by filtration or centrifugation or by dissolving the alkali mercaptide in a lower alkanol solvent immiscible with the inert organic medium, and separating the two immiscible phases.

BACKGROUND OF THE INVENTION

This invention relates to an improved process for preparing alkali mercaptides and more particularly is directed to an improvement in the process of preparing anhydrous alkali mercaptides of the formula (1)     R—S—M wherein R is alkyl of 1 through 4 carbon atoms or allyl; and
M is sodium, lithium, or potassium;

by reacting an excess of a suitable mercaptan with sodium, lithium or potassium hydroxide in an inert organic medium followed by azeotropic distillation to remove the water added with the base or formed in the reaction, the improvement comprising adding additional mercaptan during the distillation. The resultant anhydrous alkali mercaptide slurry can be used as is, or the alkali mercaptide can be separated from the organic medium.

It is known to the art to prepare anhydrous alkali mercaptides such as potassium or sodium methyl mercaptide by reaction of aqueous alkali hydroxides with alkyl mercaptans followed by azeotropic distillation to remove the water. See U.S. Patent No. 3,225,105. However, such prior art methods result in yields of only 60 to 70 percent based on the amount of mercaptan charged and the product contained substantial amounts of free alkali hydroxide.

I have discovered an improved method for preparing anhydrous alkali mercaptides of Formula 1 in very high yields. The anhydrous products of this invention are virtually free of alkali hydroxides and can be used whenever there is need for an alkali mercaptide and particularly where there is a need for exclusion of water. For example, the products of this invention are exceptionally useful in preparing thioimidate carbamate insecticides by the procedure disclosed in copending application Ser. No. 702,084 filed Jan. 31, 1968.

SUMMARY

In summary this invention is directed to an improvement in the process for preparing anhydrous alkali mercaptides of the formula (1)     R—S—M wherein R and M are as described above;

by reacting from 20 to 100% of the required stoichiometric amount of a mercaptan of the formula (2)     R—SH wherein R is as defined above;

with an alkali base selected from the group consisting of sodium hydroxide, lithium hydroxide and potassium hydroxide, in an inert water-immiscible organic medium having a boiling point of between 65 and 155° C., removing water by azeotropic distillation; the improvement comprising adding to the reaction mass during distillation the balance of the required stoichiometric amount and from 5 to 95% excess over stoichiometric of the mercaptan.

The product can be used as a slurry of anhydrous alkali mercaptide in the organic liquid and can also be separated from the organic liquid, prior to use, by either (a) Physically separating the solid product from the organic medium such as by filtration or centrifugation and drying at a temperature below 150° C. such as in a vacuum dryer or rotary or drum dryer in a moisture-free atmosphere; or (b) Extracting the alkali mercaptide with a lower alkanol immiscible with the organic medium of the reaction, and then separating the alkanol from the organic medium. The alcoholic solution of alkali mercaptide can be used as is, or it can be concentrated by removal of some of the alcohol, or the alcohol can be separated entirely from the solid product by conventional means.

The resultant product either in dry form, as an organic liquid slurry, or as an alcohol solution, is exceptionally useful where anhydrous conditions are necessary and an alkali mercaptide is called for such as in preparing thioimidate carbamate insecticides as stated above.

DESCRIPTION OF THE INVENTION

Reactants

The reactants suitable for use in this invention are allyl mercaptan or one-to-four carbon alkyl mercaptans, and sodium, lithium or potassium hydroxide.

The mercaptans can be prepared by means well known to the art or can be obtained commercially.

Similarly the alkali hydroxides can be prepared by means well known to the art or can be obtained commercially.

Purity of the starting materials is not critical and technical grade reactants are entirely satisfactory. For practical purposes it is best to avoid excessive impurities, and for practical reasons the alkali hydroxides will ordinarily be used in concentrated aqueous solution. However, dilute solutions of the alkali hydroxides can be used if desired as can finely divided solid alkali hydroxides.

Suitable organic media for use in this invention are those water immiscible organic liquids having a boiling point between 65 and 155° C. which will not react with the reactants or the product. Representative of such media are dialkyl ethers such as dibutyl ether, dialkyl sulfides such as dimethyl sulfide and hydrocarbons such as toluene, xylene, n-octane, benzene, cyclohexane, heptane and naphtha.

The preferred media are those which azeotrope with water to give at least 5 percent of water in the azeotrope and which are immiscible with a lower alkanolic solution of the anhydrous alkali mercaptides of this invention. Representative of preferred media is toluene.

Reaction conditions

The reaction of alkyl or allyl mercaptan with an alkali hydroxide can be carried out at any temperature above the freezing point and below the boiling point of the reactants. Ordinarily the temperature will not be below room temperature and conveniently the temperature can be raised to reflux immediately after admixture of the reactants thereby azeotropically removing water as the reaction is carried to completion.

The reactants are used in stoichiometric amounts with a moderate excess of mercaptan. The mercaptan is used in excess to avoid the presence in the product of any free alkali, and is added slowly during the latter part of the azeotropic distillation to minimize decomposition of the mercaptide. There is no limit to the excess of mercaptan which can be used other than practicality. The reaction will proceed at any excess but for convenience and economy it is preferred to use from 5 to 95 percent excess mercaptan over that stoichiometrically required to react with the base, and most preferably from 20 to 50 percent excess.

The water is azeotropically removed following the reaction as mentioned above. The organic liquid distillate will ordinarily be returned to the reaction after separation of the aqueous distillate phase.

The amount of organic medium used is based on the expected weight of solid mercaptide to be produced. Generally the organic medium is used in an amount ranging from about 2.5 to 4 times the expected weight of mercaptide with amounts of about 2.6 to 3 times the expected weight of mercaptide preferred.

The excess mercaptan will also come off during distillation and can conveniently be sent through a scrubber containing sodium or potassium hydroxide and the scrubber contents may then be fed to the reactor in the next reaction if desired.

The anhydrous alkali mercaptide can be used as a slurry in the organic medium or can be recovered from the medium by conventional means such as filtration or centrifugation followed by drying under anhydrous conditions at a temperature below 150° C.

The anhydrous alkali mercaptide can also be separated from the organic medium by extracting it into a lower alkanol such as methanol, ethanol, propanol or butanol and then separating the organic medium from the alcohol. The alcohol is ordinarily employed in sufficient amounts to obtain a nearly saturated solution of mercaptide in alkanol at ambient temperature or at some convenient higher temperature below the boiling points of either the reaction medium or of the alkanolic mercaptide solution. The quantity of alkanol required is commonly in the range of 1.0 to 3.0 parts by weight per part by weight of the mercaptide. It is surprising that these alcohols are satisfactory extracting agents since they are quite soluble in the hydrocarbon, ether, or disulfide reaction media. I have discovered that the alkali mercaptide dissolves preferentially and essentially quantitatively in the alcohol and thus renders the alcohol insoluble in the reaction medium. Conversely, very little of the reaction medium is dissolved in the alcohol. Thus, the extracted reaction medium can be separated by gravity and recycled to the next mercaptide synthesis batch without purification and with no significant loss of reaction medium.

The alcoholic solution can be used as is, or it can be concentrated by removal of some of the alcohol or all of the alcohol can be removed to give the anhydrous product as a solid.

As the dry product is hygroscopic it is ordinarily easier to maintain anhydrous product by keeping it in the organic medium or the alkanol solvent.

In a preferred embodiment of this invention, the alkali base is in the form of an aqueous solution, with a concentration in the range of 20% to 60% by weight of alkali hydroxide. In this preferred embodiment, a hydrocarbon solvent having a boiling point between 65 and 155° C. is used.

In the most preferred embodiment of this invention, the steps consist of:

(a) Adding sufficient methyl mercaptan to an aqueous solution of potassium hydroxide containing 20 to 60% by weight of potassium hydroxide so that about 60% of the potassium hydroxide is reacted.

(b) Removing the water by azeotropic distillation with toluene, while simultaneously bubbling mercaptan into the boiling liquid. The amount of methyl mercaptan added during this step is sufficient to react with the 40% unreacted potassium hydroxide, plus a 20 to 50% excess, based on the original amount of potassium hydroxide. The excess mercaptan is subsequently recovered by absorbing it in fresh KOH, to be used in the next batch.

(c) Recovering the product by extracting the toluene slurry with approximately 1.0 to 3.0 parts by weight of methanol per part of potassium methyl mercaptide to be extracted.

The process can be operated either batch-wise or continuously as will be apparent to those skilled in the art.

The following examples further illustrate this invention. Parts and percentages appearing in the following examples are by weight unless otherwise noted.

Example 1.—To a reaction vessel fitted with a condenser and containing 125 parts of a 45.0% aqueous potassium hydroxide solution, is added 28 parts of methyl mercaptan over a period of 30 minutes while the mixture is agitated. Three hundred parts of toluene are added to the reaction vessel and the resulting mixture is heated to boiling. The two-phase condensate is collected in a decanter from which the organic layer is continuously returned to the reactor while the aqueous layer is collected in a receiver. The condenser is vented to a standard absorber column containing 125 parts of 45% potassium hydroxide solution.

Rapid boiling is continued for one hour during which 44 parts of water accumulate in the receiver. While boiling continues, 20 parts of methyl mercaptan are added to the reactor, at the rate of 0.333 part per minute. After one hour the rate of addition of methyl mercaptan is reduced to 0.111 part per minute. The boiling and the addition of methyl mercaptan at the slower rate are continued until a total of 86.3 parts of water is collected. The dry slurry of potassium methyl mercaptide in toluene is cooled to 80° C. One hundred and thirty parts of methyl alcohol are added and the system is agitated for ten minutes. The agitator is stopped and the two liquid layers are allowed to separate while the temperature is held between 75° C. and 80° C. The lower, methanolic, layer is drained from the reactor and it totals 216 parts. The toluene content of the methanolic solution under vacuum until the crystalline solid residue does not change in weight by further vacuum evaporation yields a solid residue equivalent to 39.8% of the methanolic solution.

The potassium methyl mercaptide yield based on the water recovered is 97.2%. Subsequent analyses show that the isolated product is substantially free of potassium hydroxide and water.

The toluene layer that remains in the reactor contains less than 0.1% of methanol as determined by gas chromatography, and is substantially free of potassium methyl mercaptide or potassium hydroxide. The toluene layer can be used in a subsequent batch without further treatment.

A total of 63 parts of methyl mercaptan are added to the reactor during the course of the process which is 15 parts in excess of the theoretical amount required. This excess methyl mercaptan reacts with the potassium hydroxide solution in the scrubber, which can then be used in a subsequent batch as described below.

Example 2.—The scrubber solution containing the excess methyl mercaptan from Example 1 is charged to a reaction vessel fitted with a condenser. Thirteen parts of methyl mercaptan are charged to the reactor prior to the addition of 300 parts of toluene. The resulting mixture is heated to boiling and the reaction is completed as described in Example 1. The recovered product is essentially identical to that of Example 1 with respect to purity and yield.

Example 3.—A reaction vessel fitted with a condenser is charged with 125 parts of a 45% aqueous solution of potassium hydroxide and 215 parts of toluene. Fifty three parts of methyl mercaptan are rapidly added to the well-agitated mixture without cooling. The resulting mixture is heated to boiling. The two phase condensate is collected in a decanter from which the organic layer is continuously returned to the reactor while the aqueous layer is collected in a receiver. The boiling is stopped when the volume of aqueous layer in the receiver ceases to increase. A total of 80.9 parts of water are collected. The slurry of solids in toluene is cooled to room temperature and the solids filtered off and dried under vacuum. The weight of the solids is 84.6 parts. The potassium methyl mercaptide yield based on the water recovered is 70.5%.

Example 4.—Example 3 is repeated, except that 25 parts of methyl mercaptan are added during the latter part of the azeotropic distillation as described in Example 1. A total of 86.5 parts of water are collected. The potassium methyl mercaptide yield based on the water recovered is 98.4%.

A comparison of the yields from Examples 3 and 4 of potassium methyl mercaptide (70.5% for Example 3 versus 98.4% for Example 4) demonstrates the benefit of adding methyl mercaptan during the latter part of the azeotropic distillation to achieve a high conversion of the hydroxide to the mercaptide.

Example 5.—Example 4 is repeated except that after the volume of aqueous layer in the receiver ceases to increase, the reactor contents are cooled to 70° C. and 130 parts of methyl alcohol are added to the reactor. The resulting mixture is agitated for 10 minutes and the resulting two liquid layers are allowed to separate. The lower methanolic layer is separated and totals 217 parts. An aliquot sample of the methanolic layer is evaporated under vacuum until the crystalline solid residue does not change in weight by further vacuum evaporation. The solid residue represents 39.6% of the methanolic solution.

An aliquot of the methanolic solution analyzes less than 0.5 weight percent of water.

Example 6.—To a reactor containing 80 parts of a 50% aqueous solution of sodium hydroxide and 215 parts of toluene is added 48 parts of methyl mercaptan with agitation over a one-hour period without cooling. The reactor contents are heated to boiling. The two phase condensate is collected in a decanter from which the organic layer is continuously returned to the reactor while the aqueous layer is collected in a receiver. The boiling continues for two hours after which the aqueous layer in the receiver ceases to increase in volume. During this two hour period, 57.6 parts of water are collected and 27 parts of methyl mercaptan are continuously added to the reactor.

The reaction mixture is cooled to 75° C. and 130 parts of methanol are added. After stirring for ten minutes the two liquid phases are allowed to separate. Analysis of the methanolic layer indicates a conversion to sodium methyl mercaptide of 98% based on the sodium hydroxide charged.

Example 7.—To a reactor containing a well agitated mixture of 125 parts of a 45% aqueous solution of potassium hydroxide and 215 parts of toluene is added 28 parts of methyl mercaptan over a period of 30 minutes without cooling. The mixture is then heated to boiling. The two phase condensate is collected in a decanter from which the organic layer is continuously returned to the reactor and the aqueous layer is collected in a receiver. When 44 parts of water have accumulated in the receiver, the addition of methyl mercaptan is resumed as the distillation continues. Twenty additional parts of methyl mercaptan are added over a period of one hour after which the rate of addition of the mercaptan is considerably reduced. The distillation and the addition of excess mercaptan are continued until the aqueous layer in the receiver ceases to increase in volume. Fifteen parts of mercaptan in excess of the amount stoichiometrically required by the alkali metal hydroxide are used. The slurry of potassium methyl mercaptide in toluene reaction medium is cooled to 75° C. and 130 parts of methyl alcohol are added. The mixture is agitated vigorously for 10 minutes and the resulting two liquid layers are allowed to separate. The methanolic layer is removed from the reactor and amounts to 215 parts. The methanolic layer is evaporated under vacuum until the crystalline, solid potassium methyl mercaptide does not change in weight by further vacuum evaporation. The solid residue amounts to 40% by weight of the methanolic solution.

Examples 8 to 15.—Example 7 is repeated except that the alkali metal hydroxide, mercaptan, reaction medium and alcohol used in each example are as summarized in the following table. The mercaptide is isolated and recovered in the alcohol phase. Results similar to those in Example 7 are obtained.

| | | | Parts of mercaptan charged by weight | | | | |
|---|---|---|---|---|---|---|---|
| | Alkali metal hydroxide, 1.00 mole charged as— | Mercaptan used | Prior to boiling | During latter part of distillation | Reaction medium used | Parts of reaction medium charged | Alcohol used as extractant |
| Example: | | | | | | | |
| 8 | 45% aqueous KOH | n-Butyl mercaptan | 18 | 77 | Cyclohexane | 320 | Methanol. |
| 9 | 20% aqueous KOH | Ethyl mercaptan | 37 | 38 | Heptane | 300 | Ethanol. |
| 10 | 90% KOH flake | n-Propyl mercaptan | 46 | 57 | Benzene | 400 | Isopropanol. |
| 11 | 90% NaOH pellets | Isopropyl mercaptan | 76 | 72 | Dimethyl disulfide | 390 | n-Propanol. |
| 12 | 50% aqueous NaOH | Allyl mercaptan | 15 | 104 | Xylene | 350 | Methanol. |
| 13 | 20% aqueous NaOH | Ethyl mercaptan | 37 | 28 | Dibutyl ether | 295 | n-Propanol. |
| 14 | LiOH monohydrate crystals | Methyl mercaptan | 29 | 29 | Toluene | 170 | Methanol. |
| 15 | 45% aqueous KOH | do | 48 | 19 | Octane | 220 | tert-Butanol. |

I claim:
1. An improvement in the process for preparing anhydrous alkali mercaptides of the formula

(1)                      R—S—M wherein
R is alkyl of 1 through 4 carbon atoms or allyl; and
M is sodium, lithium or potassium;

by reacting a base selected from the group consisting of sodium hydroxide, lithium hydroxide and potassium hydroxide with from 20 to 100% of the required stoichiometric amount of a mercaptan of the formula (2)                      R—SH wherein R is as defined above;

in the presence of a water-immiscible inert organic medium having a boiling point of between 65 and 155° C. and removing water from the reaction by azeotropic distillation; said improvement comprising adding to the reaction mass during distillation any balance of the required stoichiometric amount and from 5 to 95% excess over stoichiometric of the mercaptan.

2. The process of claim 1 in which the base is potassium hydroxide.

3. The process of claim 1 in which the inert organic medium is toluene.

4. The process of claim 1 in which the mercaptan is methyl mercaptan.

5. The process of claim 1 in which the mercaptan is added in an amount ranging from 20% to 50% excess over stoichiometric.

6. The process of claim 1 in which the anhydrous alkali mercaptide is isolated from the inert organic medium and is dried under anhydrous conditions at a temperature below 150° CC.

7. The process of claim 1 in which the anhydrous alkali mercaptide is removed from the inert organic medium by dissolving the mercaptide in a lower alkanol and then separating the lower alkanol and inert organic medium.

8. The process of claim 7 in which the base is potassium hydroxide.

9. The process of claim 7 in which the inert organic medium is toluene.

10. The process of claim 7 in which the mercaptan is methyl mercaptan.

11. The process of claim 7 in which the alkanol is methanol.

12. The process of claim 7 in which the mercaptan is added in an amount ranging from 20% to 50% excess over stoichiometric.

13. The process of claim 8 in which the inert organic medium is toluene, the mercaptan is methyl mercaptan, the alkanol is methanol and the mercaptan is added in an amount ranging from 20% to 50% excess over stoichiometric.

References Cited
UNITED STATES PATENTS

| | | | |
|---|---|---|---|
| 3,225,105 | 12/1965 | Warner et al. | 260—609 C |
| 3,223,734 | 12/1965 | Fallstad et al. | 260—583 |
| 3,404,175 | 10/1968 | Mercier | 260—488 |

JOSEPH REBOLD, Primary Examiner

D. R. PHILLIPS, Assistant Examiner

U.S. Cl. X.R.

203—14